C. F. MURRAY.
ADJUSTABLE BRAKE HEAD.
APPLICATION FILED FEB. 8, 1911.

1,005,999.

Patented Oct. 17, 1911.

UNITED STATES PATENT OFFICE.

CHARLES F. MURRAY, OF EVANSTON, ILLINOIS, ASSIGNOR TO SIMPLEX RAILWAY APPLIANCE COMPANY, OF CHICAGO, ILLINOIS, A CORPORATION OF ILLINOIS.

ADJUSTABLE BRAKE-HEAD.

1,005,999.  Specification of Letters Patent.  Patented Oct. 17, 1911.

Application filed February 8, 1911. Serial No. 607,349.

*To all whom it may concern:*

Be it known that I, CHARLES F. MURRAY, a citizen of the United States, residing at Evanston, in the county of Cook and State of Illinois, have invented certain new and useful Improvements in Adjustable Brake-Heads, of which the following is a specification.

My invention relates to adjustable brake heads and has particular reference to a brake head of this character which shall have provision for efficient locking means and which shall be simple in construction.

I am aware that forms of brake heads have been devised wherein an upward thrust of a locking block is relied upon to hold the brake head in adjusted position. However, this result has usually been accomplished by means of springs and without positive locking effect.

Therefore, one of the objects of my invention is provision of an adjustable brake head which shall avoid the use of springs.

As will be understood, the limits, as established by the Master Car Builders as to wheel base, precludes the employment of adjustable brake heads which shall project horizontally from the head, therefore, the adjusting means must be at the top or bottom of the head and as the brake hanger prevents the location of the adjusting means at the top, the space which remains is at the bottom only.

One of the objects of my invention, therefore, is to provide a positive locking means which shall occupy but small space and which shall further be so constructed that if the locking nut be lost or the locking bolt broken that the head cannot accidentally be removed from the sleeve.

My invention will be more readily understood by reference to the accompanying drawings wherein—

Figure 1:
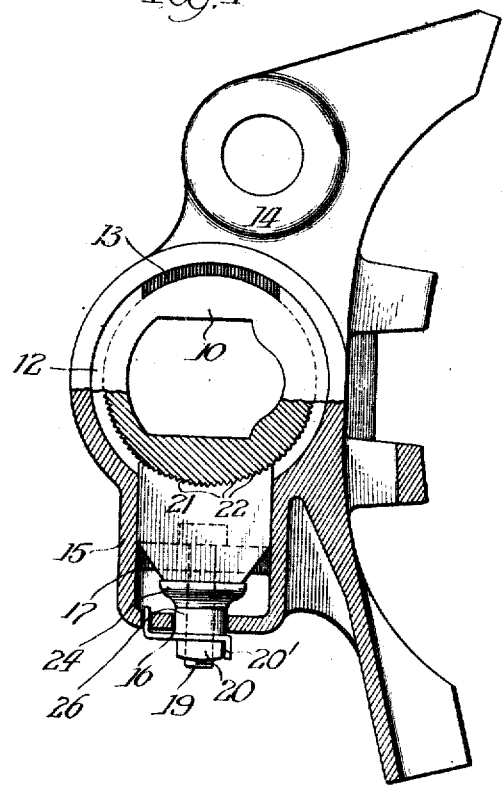
Figure 2:
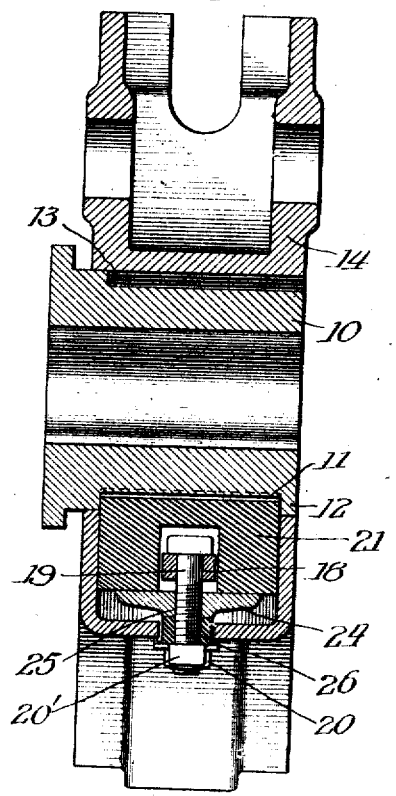
Figure 4:
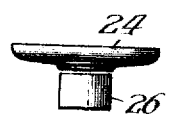
Figure 3:
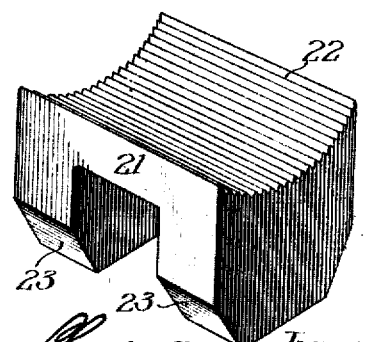

Figure 1 is a side elevation, partly in section, showing a brake head as contemplated by my invention; Fig. 2 is a central vertical section thereof; Fig. 3 is an enlarged perspective of the locking block of my invention; Fig. 4 is a view of the combined span and ferrule employed in connection with my locking means and Fig. 5 is a modified form of span.

Referring more particularly to the drawings, it will be understood that the compression and tension members of the brake beam, not shown, are adapted to be accommodated within the concentric opening in the sleeve 10, these members being secured in the sleeve in any well known manner. The sleeve 10 is provided with the continuous peripheral groove 11 having corrugations at the inner end thereof, the form of this peripheral groove providing the annular flange 12 which is continuous except at the point 13. A brake head 14 is rotatably mounted on the sleeve 10 and is provided with a housing 15 closed at its lower end except for the opening 16 for the purpose hereinafter described. The upper end of the housing is open to the interior of the brake head. A strut 17, preferably integral with the housing, is provided with an opening 18 within which is seated a bolt 19. A nut 20 and a nut lock 20' provide means for setting and locking the bolt as desired. A locking block 21, shown in Fig. 3, is curved on its upper surface to correspond to the radius of the lower portion of the groove 11 and this upper surface is preferably corrugated or roughened as shown at 22. The locking block has a pair of downwardly extending legs 23, these legs being adapted to straddle the strut 17. A span 24 having a bolt opening 25 therein is adapted to bear against the lower ends of the legs 23 and a ferrule 26 provides the bearing connection between the nut 20 and the span 24.

Figure 5:

As shown in Fig. 5 I may prefer to construct span 24 and ferrule 26 in one piece although this is not preferable as some difficulty may be experienced in seating the span and ferrule in their proper location if they are cast in one piece.

In assembling my improved brake head the span 24 is first placed within the housing underneath the strut 17, the bolt 19 is next seated in the strut, the locking block is next placed within the housing through the interior of the opening through the brake head. When this is done the locking block will rest on the head of the bolt 19 and a portion of the block will extend within the radius of the opening through the brake head. The head is then given a half turn from the position shown in the drawings, and in this position the projecting portion of the locking block will register with the opening 13 of the annular flange 12. The brake head may be then slipped on to the sleeve and returned to its upright position. It will be seen that the head cannot possibly be removed until it is turned to the point where the locking block registers with the opening 13 of the flange. The ferrule 26 is then added to the bolt and then the nut 20. It will be seen that by advancing the nut 20 on its threads the force exerted thereby will be transmitted to the ferrule, the span, and the downwardly projecting legs of the locking block 21, thence to the sleeve. If the nut 20 should become loose and be lost the locking block may descend for a short distance and its locking action, of course, will cease but the head cannot be removed from the sleeve until it is given a half turn.

It will be understood that various modifications may be made in this structure all of which come within the scope of the claims herein.

I claim:

1. An adjustable brake head comprising, in combination, a sleeve having a groove and a discontinuous flange, a locking block mounted within a housing in said head, a strut within said housing, and means for transmitting a thrust from said strut to said locking block, substantially as described.

2. An adjustable brake head comprising, in combination, a sleeve having a groove and a discontinuous annular flange, a positively actuated locking block mounted within a housing in said head, a strut within said housing, a span coöperating with said locking block, and a bolt adapted to transmit a thrust from said strut to said locking block, substantially as described.

CHARLES F. MURRAY.

Witnesses:
S. S. COTTLE,
M. ROBERTSON.